(12) United States Patent
Cheng et al.

(10) Patent No.: US 12,001,628 B2
(45) Date of Patent: Jun. 4, 2024

(54) ELECTRONIC DEVICE

(71) Applicant: ASUSTeK COMPUTER INC., Taipei (TW)

(72) Inventors: Chao-Chieh Cheng, Taipei (TW); Yi-Ou Wang, Taipei (TW); Ya-Ting Chen, Taipei (TW); Chun-Tsai Yeh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/689,083

(22) Filed: Mar. 8, 2022

(65) Prior Publication Data

US 2022/0300106 A1 Sep. 22, 2022

(30) Foreign Application Priority Data

Mar. 17, 2021 (TW) ................... 110109636

(51) Int. Cl.
*G06F 3/041* (2006.01)
*G06F 3/0354* (2013.01)
*G06F 3/038* (2013.01)

(52) U.S. Cl.
CPC ........ *G06F 3/0416* (2013.01); *G06F 3/03545* (2013.01); *G06F 3/0383* (2013.01)

(58) Field of Classification Search
None
See application file for complete search history.

(56) References Cited

U.S. PATENT DOCUMENTS

| | | | |
|---|---|---|---|
| 10,437,468 B2 | 10/2019 | Yu et al. | |
| 10,732,676 B2 | 8/2020 | Xu et al. | |
| 11,237,654 B2 | 2/2022 | Chen et al. | |
| 2013/0271395 A1 | 10/2013 | Tsai et al. | |
| 2014/0368455 A1 | 12/2014 | Croisonnier et al. | |
| 2016/0103496 A1* | 4/2016 | Degner | G06F 1/169 345/157 |
| 2016/0103610 A1 | 4/2016 | Huh | |
| 2016/0180762 A1* | 6/2016 | Bathiche | G06F 3/038 345/174 |
| 2016/0349989 A1* | 12/2016 | Yu | G06F 3/041 |
| 2017/0344215 A1* | 11/2017 | Zhang | G06F 1/169 |

(Continued)

FOREIGN PATENT DOCUMENTS

| | | |
|---|---|---|
| CN | 101510133 A | 8/2009 |
| CN | 104035606 A | 9/2014 |

(Continued)

*Primary Examiner* — Stephen T. Reed
(74) *Attorney, Agent, or Firm* — McClure, Qualey & Rodack, LLP

(57) ABSTRACT

The disclosure provides an electronic device adapted to communicate with a stylus. The electronic device includes a display panel, a touch module, and a processor. The display panel has a display area, the touch module has a touchable area, and the processor is electrically connected to the display panel and the touch module. The processor is configured to: define at least one effective input area in response to an operation of the stylus in the touchable area, and when the touch module detects that the stylus is approaching the effective input area, switch the effective input area to a stylus mode, and display a range marking pattern in the effective input area.

12 Claims, 16 Drawing Sheets

(56) References Cited

U.S. PATENT DOCUMENTS

2019/0073003 A1\* 3/2019 Xu .................. G06F 1/1692
2020/0019255 A1 1/2020 Gilbert et al.

FOREIGN PATENT DOCUMENTS

| CN | 106292859 A | 1/2017 |
| CN | 209028503 U | 6/2019 |
| TW | I455011 B | 10/2014 |
| TW | I697822 B | 7/2020 |

\* cited by examiner

ELECTRONIC DEVICE

CROSS-REFERENCE TO RELATED APPLICATION

This application claims the priority benefit of Taiwan Application Serial No. 110109636, filed on Mar. 17, 2021. The entirety of the above-mentioned patent application is hereby incorporated by reference herein and made a part of specification.

BACKGROUND OF THE INVENTION

Field of the Invention

The disclosure provides an electronic device for use in combination with a stylus.

Description of the Related Art

As notebook computers become popular, a large-sized touchpad improves use convenience for users and forms a new trend. In addition, the large-sized touchpad supports a write function and use of a stylus, providing more diverse input manners.

When the stylus is drawing or writing on a touchpad supporting the write function, mapping is synchronized to a screen. However, a sensing input area on the touchpad supporting the stylus is at a fixed location and has a fixed size, failing to adapt to the different strong hands and drawing habits of different users. As a result, the users cannot use the stylus freely.

BRIEF SUMMARY OF THE INVENTION

The disclosure provides an electronic device adapted for use in combination with a stylus. The electronic device includes a display panel, a touch module, and a processor. The display panel has a display area, the touch module has a touchable area, and the processor is electrically connected to the display panel and the touch module. The processor is configured to: define at least one effective input area in response to the operation of the stylus in the touchable area, and when the touch module detects that the stylus is approaching the effective input area, switch the effective input area to a stylus mode, and display a range marking pattern in the effective input area.

In conclusion, according to the disclosure, by detecting the location of the stylus and by means of detection modes of the stylus function and switching, the location of the effective input area of the stylus is adjusted according to user requirements. Therefore, the adjustment of the effective input area is more flexible. In this way, a more convenient layout configuration is actively provided to a user when the user uses the stylus, and the location of the effective input area on the touch module is clearly marked.

DETAILED DESCRIPTION OF THE EMBODIMENTS

Figure 1:
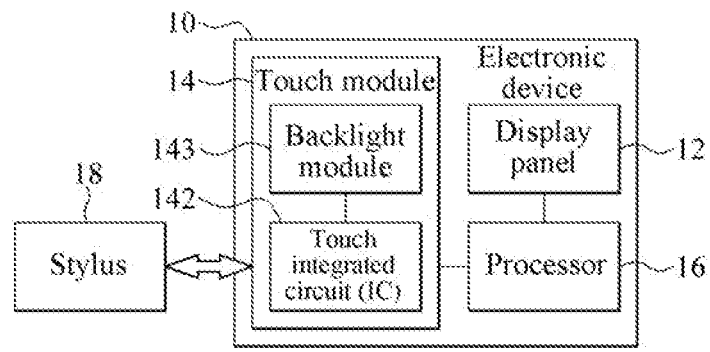
FIG. 1 is a schematic block diagram of an electronic device according to an embodiment of the disclosure.
Figure 2:
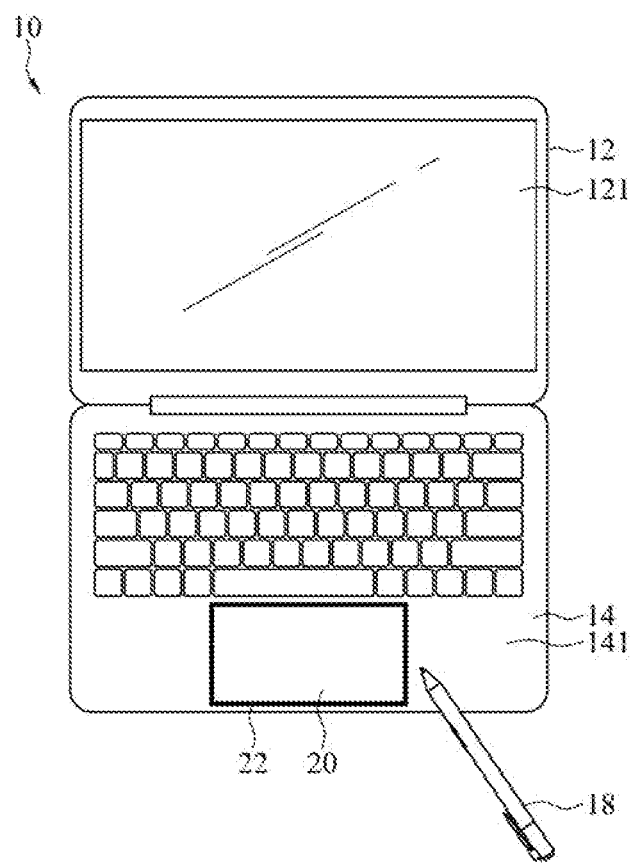
FIG. 2 is a schematic diagram of a display state of the electronic device according to an embodiment of the disclosure.

Referring to FIG. 1 and FIG. 2, an electronic device 10 is adapted to communicate with a stylus 18. The electronic device 10 includes a display panel 12, a touch module 14, and a processor 16. In an embodiment, the display panel 12 has a display area 121, the touch module 14 is a touchpad and has a touchable area 141, and the processor 16 is electrically connected to the display panel 12 and the touch module 14. The processor 16 defines at least one effective input area 20 in response to an operation of the stylus 18 in the touchable area 141. When the touch module 14 detects that the stylus 18 is approaching, the processor 16 switches the corresponding effective input area 20 to a stylus mode, and the processor 16 controls the touch module 14 to display a range marking pattern 22 in the effective input area 20. The range marking pattern 22 is used as a marking boundary of the effective input area 20 to provide a user with a clear and definite input range of the stylus 18.

The touch module 14 further includes a touch integrated circuit (touch IC) 142 and a backlight module 143. The touch IC 142 is electrically connected to the backlight module 143. Therefore, the touch IC 142 controls a specific location of the backlight module 143 to be lighted according to a control command of the processor 16, so that a part of the backlight module 143 corresponding to the above effective input area 20 is lighted to display the range marking pattern 22.

In an embodiment, the electronic device 10 is a notebook computer, and the touch module 14 is any input module supporting write and input in addition to the touchpad. The disclosure is not limited thereto.

In an embodiment, the processor 16 further defines a plurality of effective input areas 20 in the touchable area 141. Three effective input areas 20 are exemplified herein. Each effective input area 20 corresponds to a range marking pattern 22. When one of the effective input areas 20 is enabled, the corresponding range marking pattern 22 is lighted to mark a location of the enabled effective input area 20, so as to indicate an effective use range of the stylus 18.

Figure 3A:
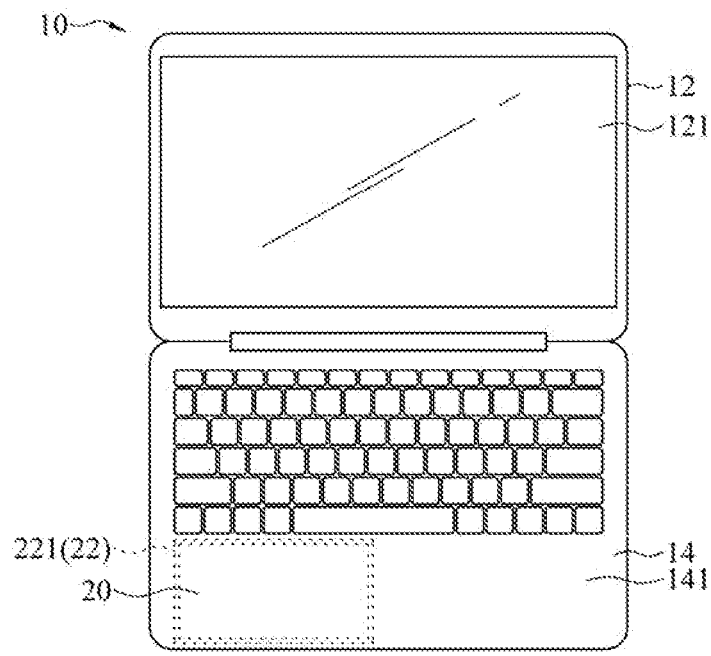
FIG. 3A to FIG. 3C each are a schematic diagram of the electronic device using a rectangular marking pattern according to an embodiment of the disclosure.
Figure 3B:
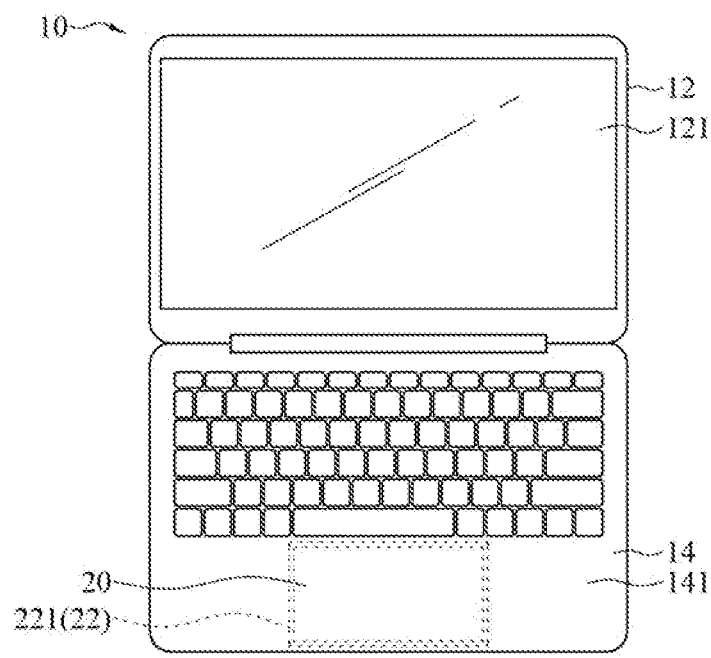
Figure 3C:
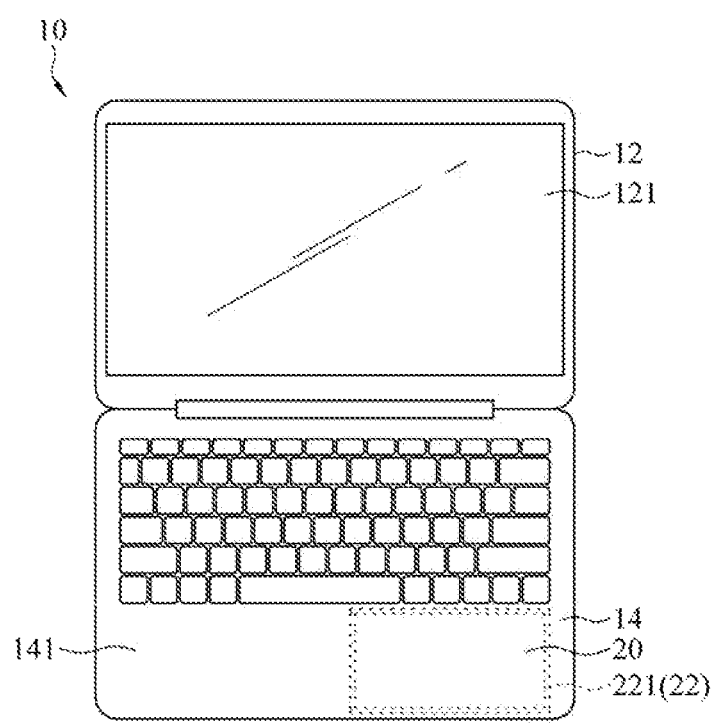

The range marking pattern 22 on the touch module 14 is any shape or line segment that can mark a location or a range. In this embodiment, the range marking pattern 22 is a rectangular marking pattern 221, a four-corner marking pattern 222, or a line segment marking pattern 223. As shown in FIG. 3A, the range marking pattern 22 is the rectangular marking pattern 221. When the effective input area 20 is at a left location of the touchable area 141 of the touch module 14, the rectangular marking pattern 221 corresponding to the effective input area 20 is at the left location and surrounds the effective input area 20. As shown in FIG. 3B, when the effective input area 20 is at central location of the touchable area 141 of the touch module 14, the rectangular marking pattern 221 corresponding to the effective input area 20 is at the central location and surrounds the effective input area 20. As shown in FIG. 3C, when the effective input area 20 is at a right location of the touchable area 141 of the touch module 14, the rectangular marking pattern 221 corresponding to the effective input area 20 is at the right location and surrounds the effective input area 20.

Figure 4A:
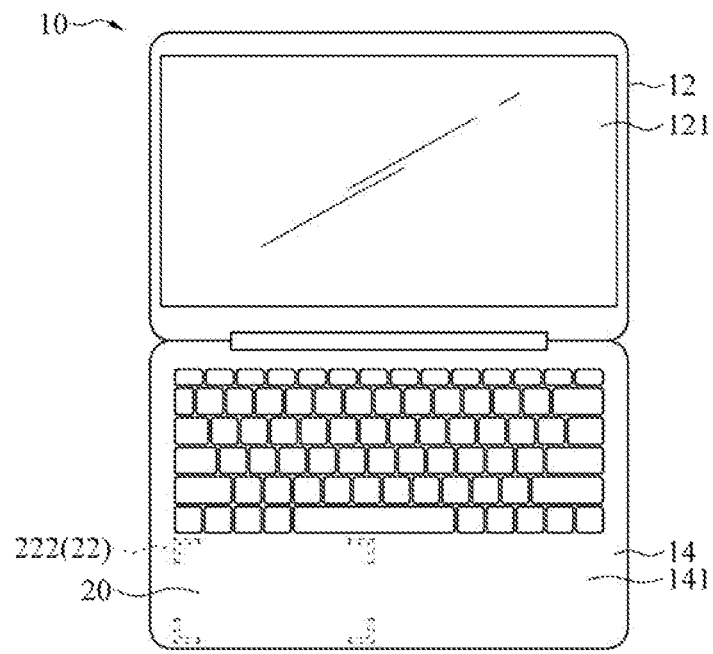
FIG. 4A to FIG. 4C each are a schematic diagram of the electronic device using a four-corner marking pattern according to an embodiment of the disclosure.
Figure 4B:
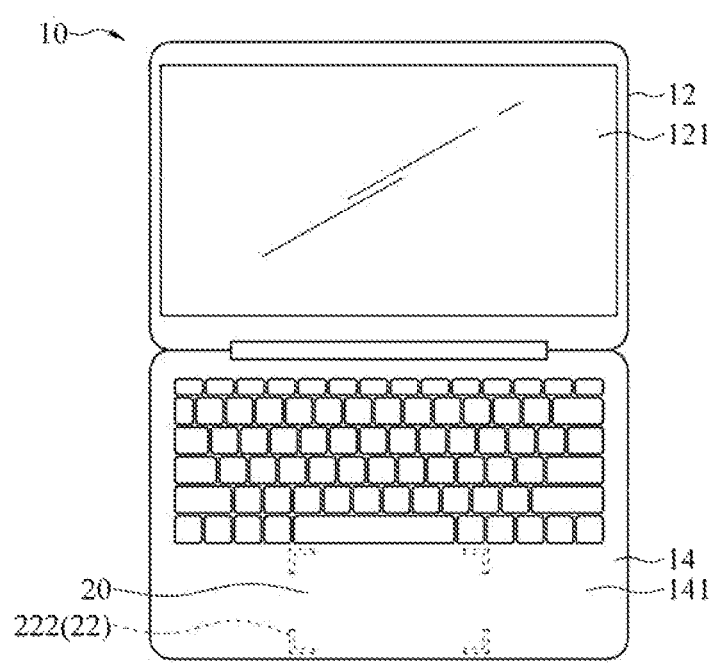
Figure 4C:
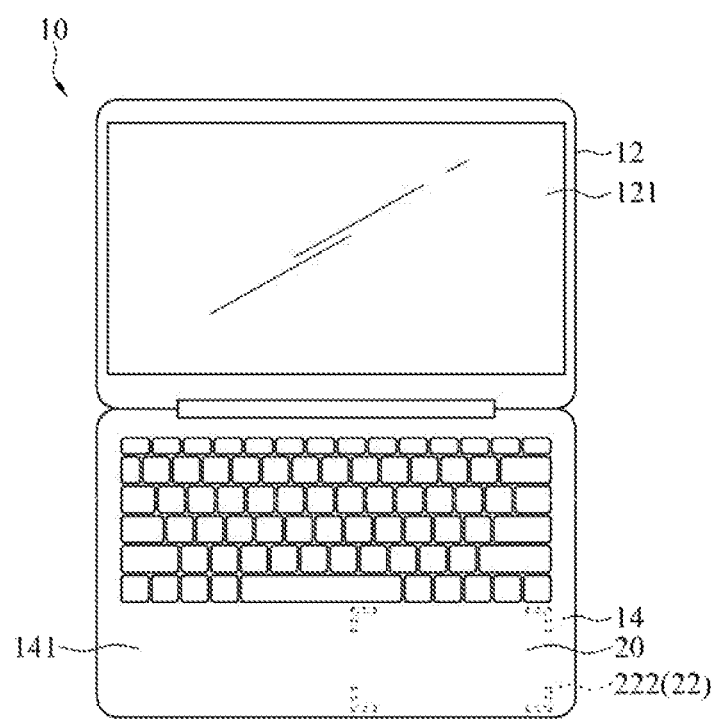

As shown in FIG. 4A, the range marking pattern 22 is the four-corner marking pattern 222. When the effective input area 20 is at the left location of the touchable area 141 of the touch module 14, the four-corner marking pattern 222 corresponding to the effective input area 20 is at the left location and four corners of the effective input area 20. As shown in FIG. 4B, when the effective input area 20 at the central location of the touchable area 141 of the touch module 14, the four-corner marking pattern 222 corresponding to the effective input area 20 is at the middle location and the four corners of the effective input area 20. As shown in FIG. 4C, when the effective input area 20 is at the right location of the touchable area 141 of the touch module 14, the four-corner marking pattern 222 corresponding to the effective input area 20 is at the right location and the four corners of the effective input area 20.

Figure 5A:
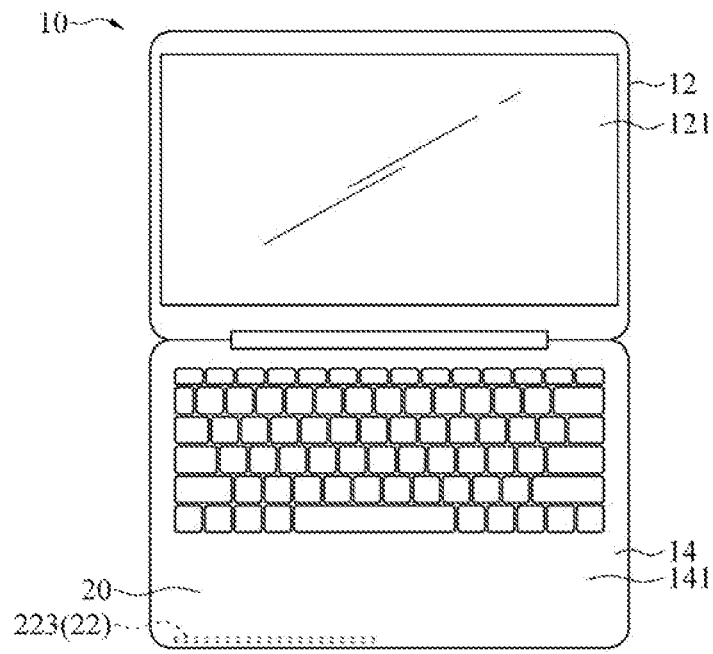
FIG. 5A to FIG. 5C each are a schematic diagram of the electronic device using line segment marking pattern according to an embodiment of the disclosure.
Figure 5B:
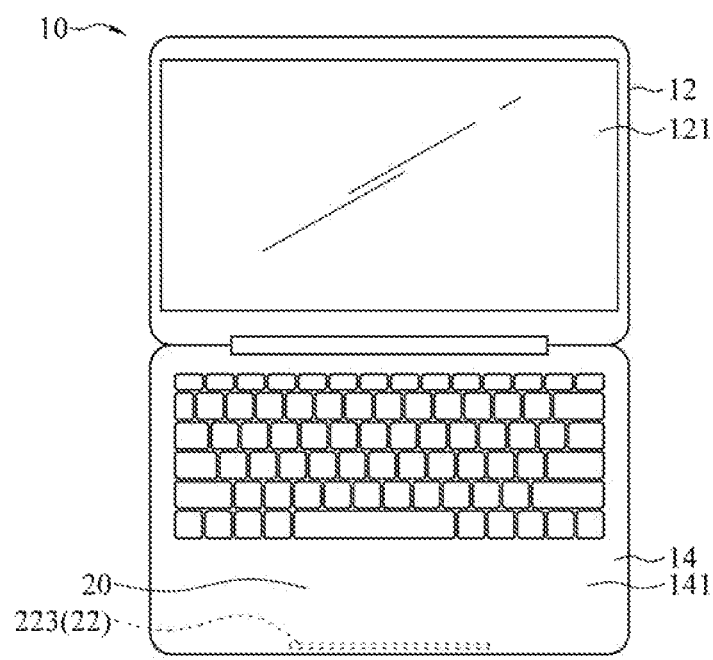
Figure 5C:
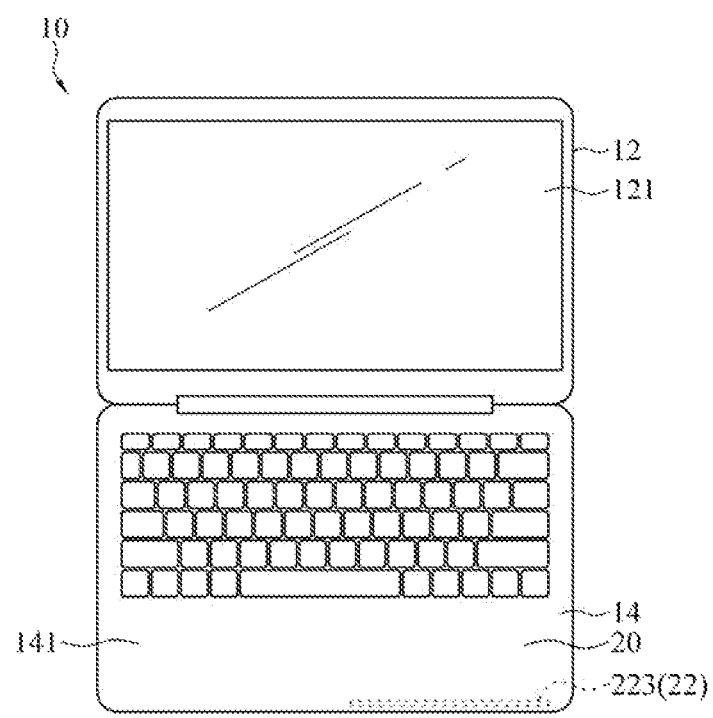

As shown in FIG. 5A, the range marking pattern 22 is the line segment marking pattern 223. When the effective input area 20 is at the left location of the touchable area 141 of the touch module 14, the line segment marking pattern 223 corresponding to the effective input area 20 is at the left location and on one side of the effective input area 20. As shown in FIG. 5B, when the effective input area 20 is at the central location of the touchable area 141 of the touch module 14, the line segment marking pattern 223 corresponding to the effective input area 20 is at the middle location and on one side of the effective input area 20. as shown in FIG. 5C, when the effective input area 20 is located at the right location of the touchable area 141 of the touch module 14, the line segment marking pattern 223 corresponding to the effective input area 20 is at the right location and on one side of the effective input area 20.

In the following embodiments, the rectangular marking pattern 221 is used as the range marking pattern 22 in the disclosure, but the disclosure is not limited thereto.

In an embodiment, the touch module 14 provides a plurality of detection modes of the stylus 18. In an embodiment, the detection mode is a whole-surface mode, a locked mode, or an automatic mode.

Figure 6:
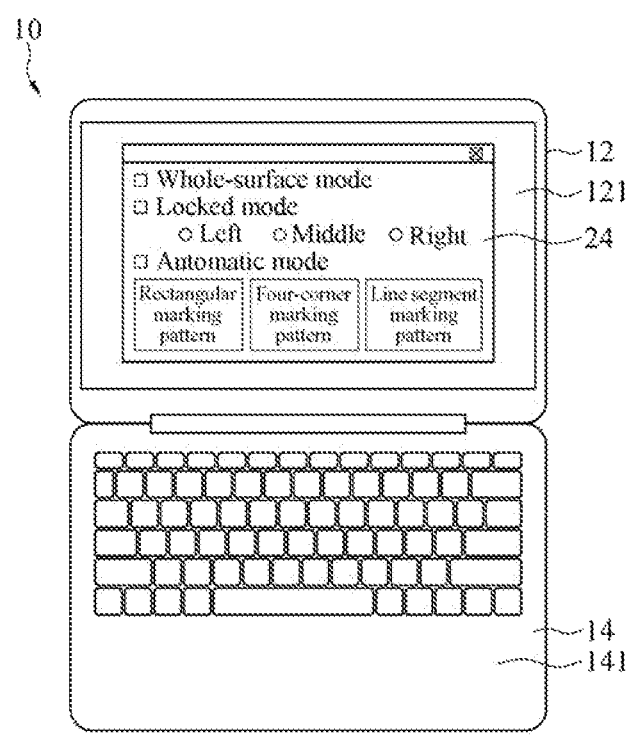
FIG. 6 is a schematic diagram of the electronic device presenting a setting interface according to an embodiment of the disclosure.

In an embodiment, referring to FIG. 1 and FIG. 6, the processor 16 further provides a setting interface 24. The setting interface 24 is displayed on the display area 121 of the display panel 12 for a user to set functions (such as detection modes and range marking patterns). The setting interface 24 is executed by an application program to open the setting interface 24 for related settings. When the user selects options of the detection modes and the range marking patterns on the setting interface 24, the setting interface 24 generates a setting request signal to the processor 16. The processor 16 receives the setting request signal, and correspondingly sets and stores a selected detection mode and a selected range marking pattern according to the setting request signal.

When the detection mode selection is set to the locked mode the setting interface 24, the user further sets the location of the effective input area 20 at the left location, the middle location, or the right location by the setting interface 24. Therefore, the processor 16 sets and stores the selected detection mode, the selected the range marking pattern, and the location of the effective input area 20 according to the setting request signal.

Figure 7:
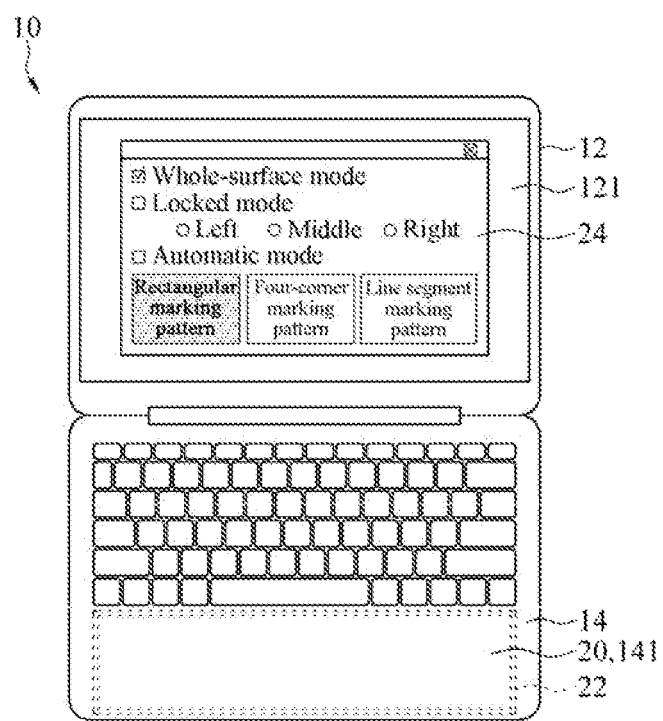
FIG. 7 is a schematic diagram of the electronic device on which a whole-surface mode is set by using a setting interface according to an embodiment of the disclosure.
Figure 8A:
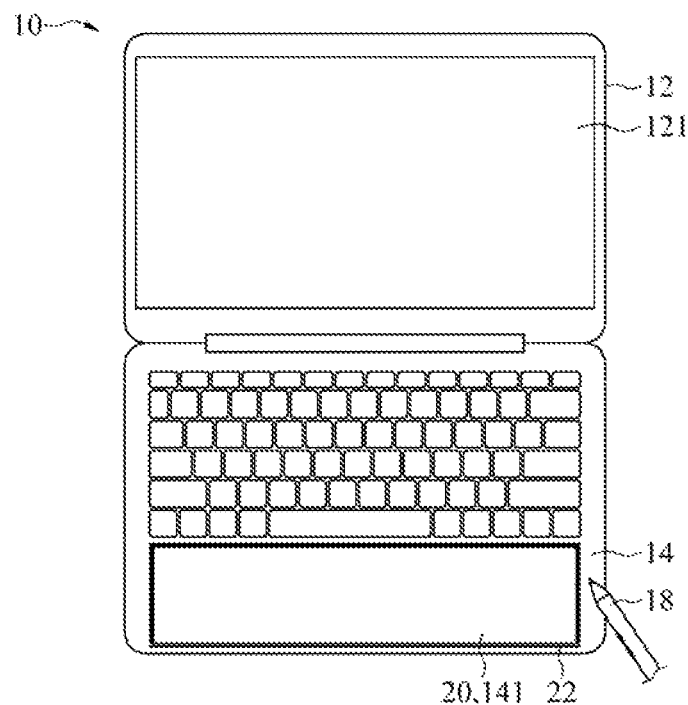
FIG. 8A is a schematic diagram of the electronic device on which a stylus function is enabled in the whole-surface mode according to an embodiment of the disclosure.
Figure 8B:
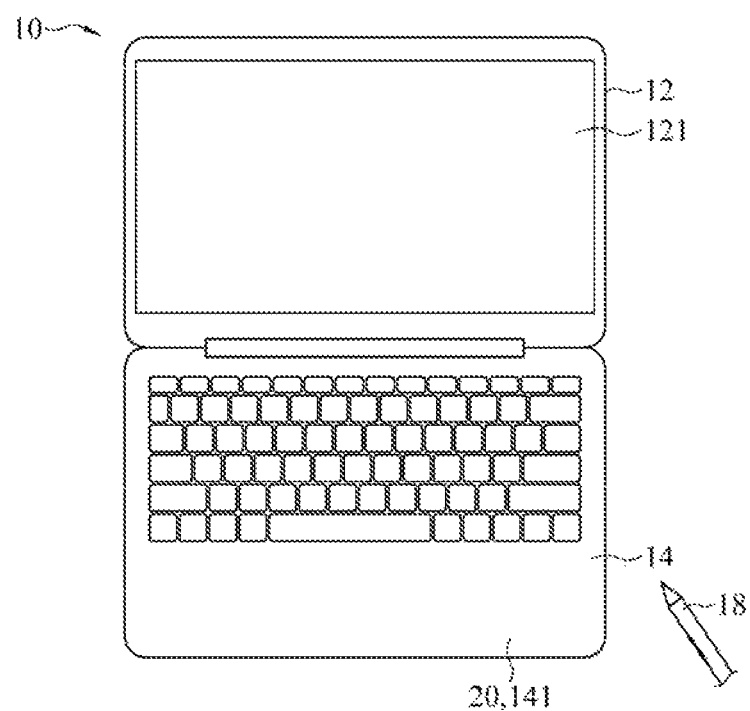
FIG. 8B is a schematic diagram of the electronic device on which the stylus function is not enabled in the whole-surface mode according to an embodiment of the disclosure.

Referring to FIG. 1 and FIG. 7, the user sets the detection mode to the whole-surface mode by the setting interface 24, and selects the rectangular marking pattern as the range marking pattern 22. In this case, the effective input area 20 is equivalent to the whole touchable area 141. When the processor 16 sets the detection mode to the whole-surface mode, as shown in FIG. 8A, and the stylus 18 enters any location within a sensing range of the touch module 14, the processor 16 enables the effective input area 20, and the touch module 14 is switched from an original preset touchpad mode to the stylus mode. In this case, the corresponding backlight module 143 is lighted to display the range marking pattern 22. When the stylus 18 is moving away from the sensing range of the touch module 14, the touch module 14 disables the stylus mode and is switched to the original touchpad mode, and turns off the backlight module 143, as shown in FIG. 8B. In this case, the range marking pattern 22 is not lighted, indicating that the stylus mode is not enabled.

Figure 9:
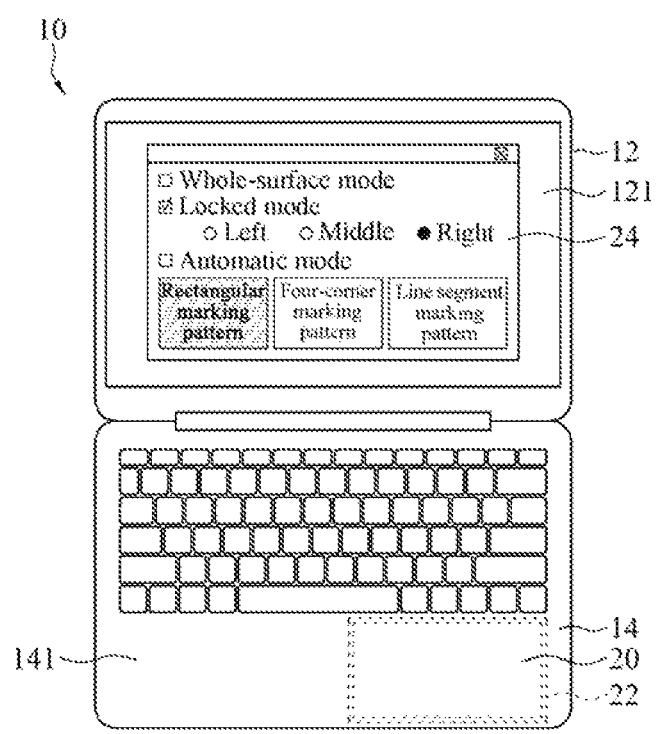
FIG. 9 is a schematic diagram of the electronic device on which a locked mode is set by using the setting interface according to an embodiment of the disclosure.
Figure 10A:
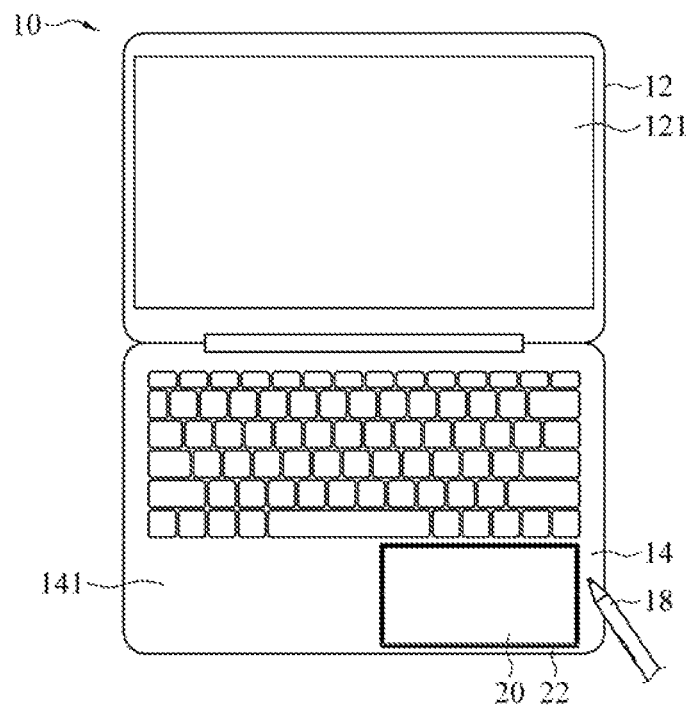
FIG. 10A is a schematic diagram of the electronic device on which the stylus function is enabled in the locked mode according to an embodiment of the disclosure.
Figure 10B:
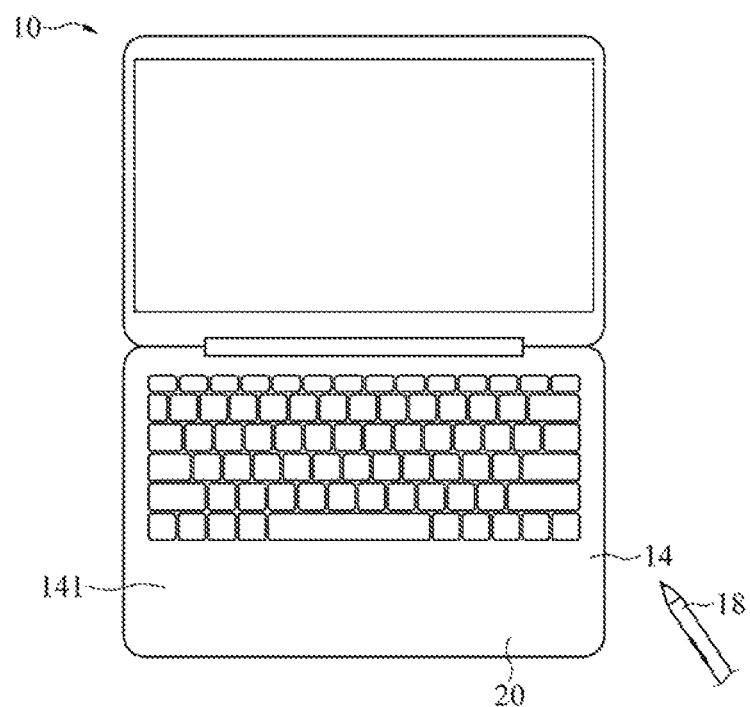
FIG. 10B is a schematic diagram of the electronic device on which the stylus function is not enabled in the locked mode according to an embodiment of the disclosure.

Referring to FIG. 1 and FIG. 9, the user sets the detection mode to the locked mode by using the setting interface 24, and sets one of a plurality of effective input areas (in an embodiment, a left effective input area, a middle effective input area, and a right effective input area) as an available area. The right effective input area 20 located on the right side of the touchable area 141 is set as the available area herein, but the disclosure is not limited thereto. The rectangular marking pattern is selected as the range marking pattern 22. When the processor 16 sets the detection mode to the locked mode and selects the right effective input area 20 as the available area, as shown in FIG. 10A, and the touch module 14 detects that the stylus 18 is approaching the available area (the right effective input area 20), the processor 16 switches the right effective input area 20 from the original preset touchpad mode to the stylus mode. The remaining area remains the touchpad mode. In this case, a part of the backlight module 143 corresponding to the available area (the right effective input area 20) is lighted to display the corresponding range marking pattern 22 on the right side. As shown in FIG. 10B, when the stylus 18 is moving away from the sensing range of the touch module 14, the touch module 14 is switched to the original touchpad mode, and the backlight module 143 is turned off. Since only the right effective input area 20 is set as the available area in this embodiment, when the touch module 14 detects that the stylus 18 is approaching the left location of the touchable area 141, the stylus mode cannot be enabled. When the processor 16 sets the left effective input area 20 as the available area, the stylus mode is enabled only when the touch module 14 detects that the stylus 18 is approaching the left effective input area 20.

Figure 11:
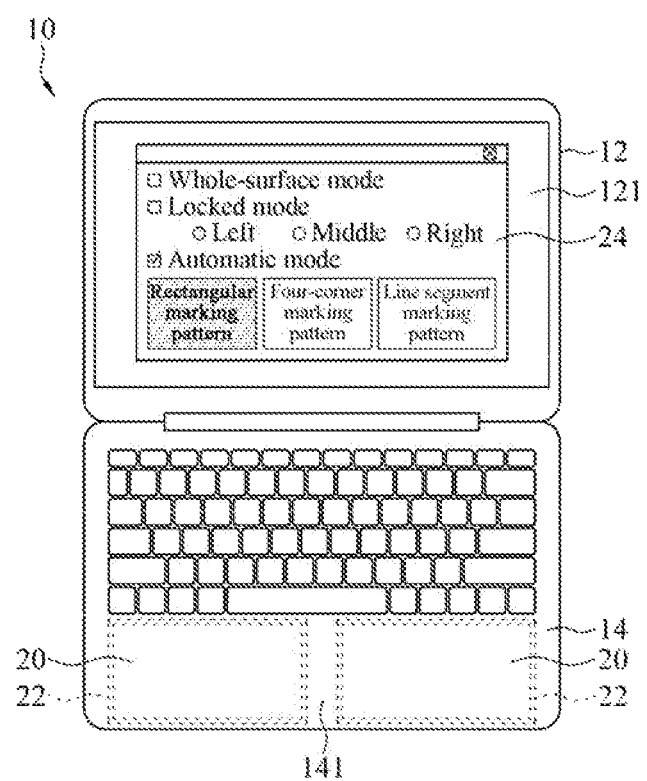
FIG. 11 is a schematic diagram of an electronic device on which an automatic mode is set by using the setting interface according to an embodiment of the disclosure.
Figure 12A:
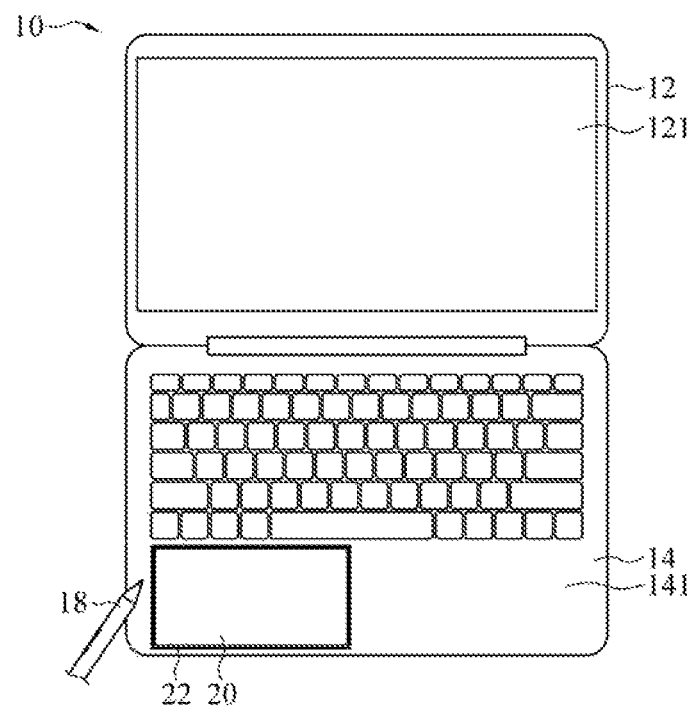
FIG. 12A is a schematic diagram of the electronic device on which a stylus function in a left effective input area is enabled in the automatic mode according to an embodiment of the disclosure.
Figure 12B:
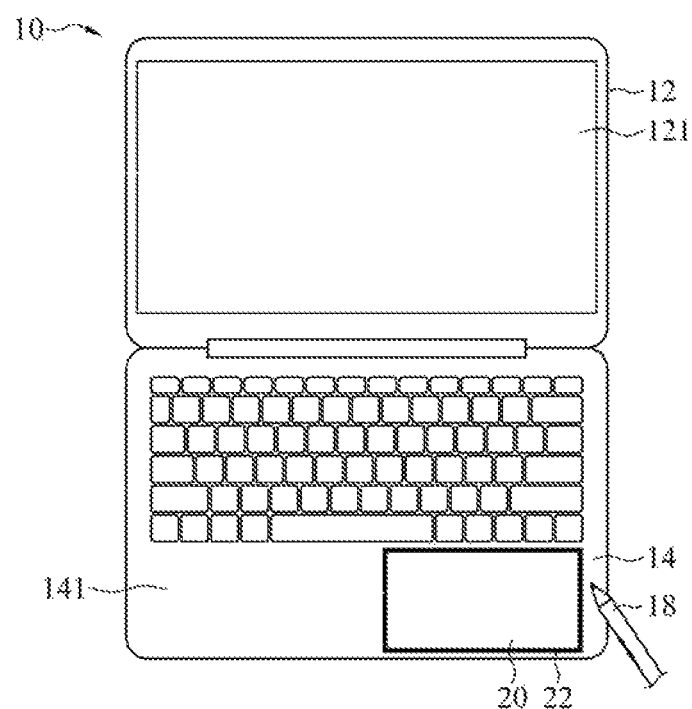
FIG. 12B is a schematic diagram of the electronic device on which a stylus function in a right effective input area is enabled in the automatic mode according to an embodiment of the disclosure.

Referring to FIG. 1 and FIG. 11, the user sets the detection mode to the automatic mode by using the setting interface 24, and selects the rectangular marking pattern as the range marking pattern 22. In this embodiment, the processor 16 defines at least two effective input areas 20 according to the touchable area 141. Two effective input areas 20 are exemplified herein. The left and right effective input areas 20 are both used as the available area. when the processor 16 sets the detection mode to the automatic mode, as shown in FIG. 12A, and the touch module 14 detects that the stylus 18 is approaching the left effective input area 20, the processor 16 enables the left effective input area 20 and controls the touch module 14 to light the left corresponding range marking pattern 22 to enable the stylus mode of the left effective input area 20. In this case, the right location remains the touchpad mode (the stylus mode is disabled). As shown in FIG. 12B, when the touch module 14 detects that the stylus 18 is approaching the right effective input area 20, the processor 16 enables the right effective input area 20 and controls the touch module 14 to light the right corresponding range marking pattern 22 to enable the stylus mode of the right effective input area 20. In this case, the left location remains the touchpad mode (the stylus mode is disabled). Therefore, in the automatic mode, when the touch module 14 detects that the stylus 18 is approaching the left side of the touch module 14, the stylus mode of the left effective input area 20 is enabled, and the stylus mode of the right effective input area 20 is enabled when the touch module 14 detects that the stylus 18 moves to the right side of the touch module 14. The left effective input area 20 and the right effective input area 20 cannot be simultaneously enabled.

Figure 13:
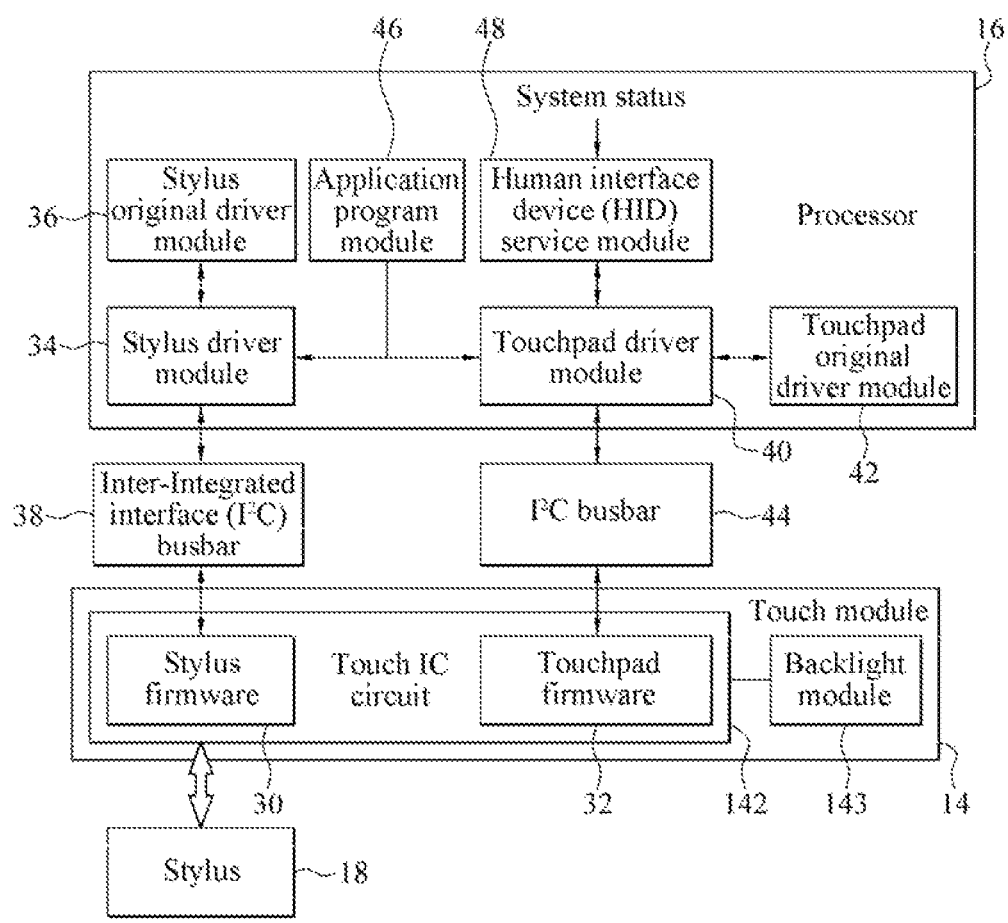
FIG. 13 is a schematic diagram of a system architecture of the electronic device according to an embodiment of the disclosure.
Figure 14:
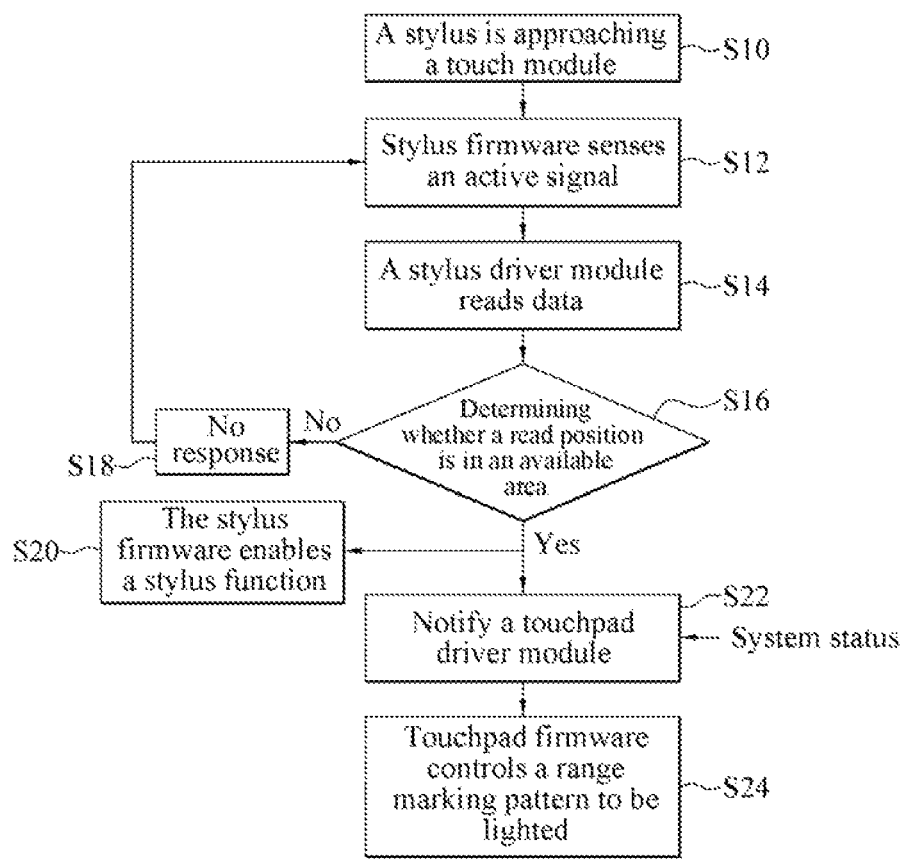
FIG. 14 is a schematic flowchart of the electronic device on which the stylus function is enabled according to an embodiment of the disclosure.

Based on the above, the enable of the stylus mode on the touch module 14 of the electronic device 10 and lighting of the location of the lighting range marking pattern 22 are jointly completed by an operating system (OS) in the processor 16 and touchpad firmware and stylus firmware in the touch IC 142 of the touch module 14. Therefore, the complete enable of the stylus mode is described from the system architecture of the processor 16. Referring to FIG. 1 and FIG. 13, a piece of stylus firmware 30 and a piece of touchpad firmware 32 are installed in the touch IC 142 to correspond to the stylus 18 and the touch module 14 respectively. In the processor 16, a stylus driver module 34 is communicated with a stylus original driver module 36, and is communicated with the stylus firmware 30 in the touch IC 142 by an inter-integrated circuit (I²C) busbar 38. Therefore, a stylus signal received by the stylus firmware 30 is transmitted to the stylus original driver module 36 through the I²C interface busbar 38 and the stylus driver module 34 to execute a corresponding stylus mode. A touchpad driver module 40 is communicated with a stylus original driver module 42, and is connected to the touchpad firmware 32 in the touch IC 142 through an I²C busbar 44. Therefore, a touchpad signal sensed by the touchpad firmware 32 is transmitted to the touchpad original driver module 42 through the I²C busbar 44 and the touchpad driver module 40 to execute a corresponding touchpad mode. The stylus driver module 34 is further connected to the touchpad driver module 40 and an application program module 46 is connected to the stylus driver module 34 and the touchpad driver module 40, for signaling transmission and communication. Another human interface device (HID) service module 48 is connected to the touchpad driver module 40 by using a signal, so as to transmit a system status of the electronic device 10 to the touchpad driver module 40.

Referring to FIG. 1, FIG. 2, FIG. 13, and FIG. 14, as shown in step S10, when the stylus 18 is approaching the touch module 14, an entire stylus mode enable process starts. As shown in step S12, the stylus firmware 30 receives an active signal transmitted by the stylus 18, and transmits sensing data corresponding to the active signal to the stylus driver module 34 through the I2C interface busbar 38. As shown in step S14, the stylus driver module 34 reads the sensing data to determine a location of the stylus 18. Next, as shown in step S16, the stylus driver module 34 determines whether the location of the stylus 18 is in the available area. If the read location is not in the available area, the touch module 14 makes no responses, as shown in step S18. If the read location of the stylus 18 is in the available area, step S20 and step S22 are performed simultaneously. As shown in step S20, the stylus driver module 34 notifies, by using the I2C interface busbar 38, the stylus firmware 30 to enable the stylus mode. At the same time, as shown in step S22, the stylus driver module 34 notifies the touchpad driver module 40 to generate a corresponding control command and transmit the control command to the touchpad firmware 32 through the I2C bus 44. As shown in step S24, the touchpad firmware 32 controls, according to the control command, the backlight module 143 and the corresponding range marking pattern 22 to be lighted.

In an embodiment, referring to FIG. 1, FIG. 2, FIG. 13, and FIG. 14, the HID service module 48 in the processor 16 further detects the background system status, and transmit the system status to the touchpad driver module 40 (as shown in step S22). Therefore, the touchpad driver module 40 determines, according to the system status, whether the touch module 14 is to display the range marking pattern 22. In an embodiment, when the touchpad driver module 40 receives, a notification for lighting the backlight module 143 from the stylus driver module 34, and the system status received by the touchpad driver module 40 is a normal operating state, the touchpad driver module 40 generates a control instruction to the touchpad firmware 32 to light the backlight module 143 accordingly so as to display the corresponding range marking pattern 22 (as shown in step S24). Although the touchpad driver module 40 has received the notification from the stylus driver module 34 to light the backlight module 143, since the system status received by the touchpad driver module 40 from the HMI device service module 48 is a sleep state, the touchpad driver module 40 determines accordingly that the backlight module 143 is not to be lighted. Therefore, no control command is transmitted to the touchpad firmware 32. In this case, the range marking pattern 22 is not displayed.

In conclusion, according to the disclosure, by detecting the location of the stylus and by means of detection modes of the stylus function and switching, the location of the effective input area of the stylus is adjusted according to user requirements. Therefore, the adjustment of the effective input area is more flexible. In this way, a more convenient layout configuration is actively provided to a user when the user uses the stylus, and the location of the effective input area on the touch module is clearly marked.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. An electronic device, adapted to communicate with a stylus, comprising:
    a display panel, having a display area;
    a touch module, having a touchable area; and
    a processor, electrically connected to the display panel and the touch module, wherein the processor is configured to:
    define at least one effective input area in the touchable area,
    switch the effective input area from an original preset touchpad mode to a stylus mode when the touch module detects that the stylus is approaching the effective input area and the processor determines that a location of the stylus is in the effective input area, and
    display a range marking pattern in the effective input area.

2. The electronic device according to claim 1, wherein the touch module further comprises a backlight module configured to display the range marking pattern.

3. The electronic device according to claim 1, wherein the touch module provides a plurality of detection modes of the stylus: a whole-surface mode, a locked mode, or an automatic mode.

4. The electronic device according to claim 3, wherein in the whole-surface mode, the effective input area is equivalent to the touchable area.

5. The electronic device according to claim 3, wherein the effective input area comprises a plurality of effective input areas, and each effective input area corresponds to a range marking pattern.

6. The electronic device according to claim 5, wherein in the locked mode, the processor selects one of the effective input areas as an available area, and when the touch module detects that the stylus is approaching the available area, the processor enables the available area, and displays the range marking pattern corresponding to the available area.

7. The electronic device according to claim 5, wherein in the automatic mode, the processor defines two of the effective input areas according to the touchable area, and the processor switches the effective input area approached by the stylus to the stylus mode and displays the range marking pattern in the effective input area approached by the stylus when the touch module detects that the stylus is approaching one of the two effective input areas.

8. The electronic device according to claim 4, wherein the processor further provides a setting interface displayed on the display panel for setting the detection mode and the range marking pattern.

9. The electronic device according to claim 8, wherein the processor receives a setting request signal generated from the setting interface, and correspondingly sets and stores the detection mode and the range marking pattern according to the setting request signal.

10. The electronic device according to claim 8, wherein the processor further sets a location of the effective input area by the setting interface when the detection mode is set to the locked mode.

11. The electronic device according to claim 2, wherein the processor further controls, according to a system status, the backlight module to or not to display the range marking pattern.

12. An electronic device, adapted to communicate with a stylus, comprising:
    a display panel, having a display area;
    a touch module, having a touchable area; and
    a processor, electrically connected to the display panel and the touch module, wherein the processor is configured to:
    define at least one effective input area in the touchable area,
    switch the effective input area from an original preset touchpad mode to a stylus mode when the touch module detects that the stylus is approaching the effective input area and the processor determines that a location of the stylus is in the effective input area, and
    display a range marking pattern in the effective input area;
    wherein when the stylus is moving away from the effective input area, the touch module disables the stylus mode and the processor switches the effective input area from the stylus mode to the original preset touchpad mode, and does not display the range marking pattern.

* * * * *